(12) United States Patent
Kadam et al.

(10) Patent No.: US 12,151,587 B2
(45) Date of Patent: Nov. 26, 2024

(54) POWER INTEGRATED CIRCUIT FOR ELECTRIC VEHICLE APPLICATIONS

(71) Applicant: Volvo Car Corporation, Gothenburg (SE)

(72) Inventors: Sumegh Kadam, Gothenburg (SE); Hicham Sadoun, Gothenburg (SE); Avishek Kumar Mohanty, Gothenburg (SE); Narendar Rao Gannamaneni, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 303 days.

(21) Appl. No.: 17/587,782

(22) Filed: Jan. 28, 2022

(65) Prior Publication Data

US 2022/0266718 A1 Aug. 25, 2022

Related U.S. Application Data

(60) Provisional application No. 63/152,115, filed on Feb. 22, 2021.

(51) Int. Cl.
*B60L 58/13* (2019.01)
*B60L 1/00* (2006.01)
*B60L 58/16* (2019.01)
*B60L 58/22* (2019.01)

(52) U.S. Cl.
CPC ............... *B60L 58/13* (2019.02); *B60L 58/16* (2019.02); *B60L 58/22* (2019.02); *B60L 1/00* (2013.01); *B60L 2210/40* (2013.01)

(58) Field of Classification Search
None
See application file for complete search history.

(56) References Cited

U.S. PATENT DOCUMENTS

| | | | |
|---|---|---|---|
| 10,361,466 B2 | 7/2019 | Hinterberger et al. | |
| 10,784,698 B2 | 9/2020 | Jaensch et al. | |
| 10,866,285 B2* | 12/2020 | Cheng | G01R 31/385 |
| 2008/0265812 A1* | 10/2008 | Adra | B60L 50/11 |
| | | | 318/375 |
| 2015/0266382 A1* | 9/2015 | Penmetsa | B60L 1/14 |
| | | | 307/10.1 |
| 2019/0023130 A1* | 1/2019 | Garcha | B60L 53/14 |
| 2019/0288526 A1* | 9/2019 | Jaensch | H01M 10/425 |

(Continued)

OTHER PUBLICATIONS

U.S. Appl. No. 63/059,300, filed Jul. 31, 2020, 89 pages.

(Continued)

*Primary Examiner* — Raul J Rios Russo
*Assistant Examiner* — Carl F. R. Tchatchouang
(74) *Attorney, Agent, or Firm* — Amin, Turocy & Watson, LLP

(57) ABSTRACT

Power and controller integrated circuits for electric vehicle applications are enabled. For example, a system can comprise a plurality of battery cells, and a plurality of application specific integrated circuits (ASICs) electrically coupled to the plurality of battery cells, wherein one or more ASICs of the plurality of ASICs comprises a respective power ASIC, and wherein the ASICs comprise respective bidirectional direct current to alternating current (DC-AC) converters and charge or discharge the plurality of battery cells.

20 Claims, 10 Drawing Sheets

(56) References Cited

U.S. PATENT DOCUMENTS

2020/0207219 A1* 7/2020 Slepchenkov .......... B60L 50/61

OTHER PUBLICATIONS

U.S. Appl. No. 17/306,221, filed May 3, 2021, 88 pages.
US Non-Provisional Patent Application Serial No. 117/306,248 filed May 3, 2021, 89 pages.
US Non-Provisional Patent Application Serial No. 117/306,256 filed May 3, 2021, 89 pages.
US Non-Provisional Patent Application Serial No. 117/306,230 filed May 3, 2021, 88 pages.
Extended European Search Report received for E.P Patent Application Serial No. 22158055.8 dated Nov. 30, 2022, 6 pages.
Communication Pursuant to Rule 69 EPC received for E.P Patent Application Serial No. 22158055.8 dated Jan. 9, 2023, 2 pages.
Notification of European publication number and information on the application of Article 67(3) EPC received for E.P Patent Application Serial No. 22158055.8 dated Nov. 30, 2022, 2 pages.
Extended European Search Report received for E.P Patent Application Serial No. 22158056.6 dated Jul. 25, 2022, 7 pages.
Communication Pursuant to Rule 69 EPC received for E.P Patent Application Serial No. 22158056.6 dated Aug. 29, 2022, 2 pages.

* cited by examiner

POWER INTEGRATED CIRCUIT FOR ELECTRIC VEHICLE APPLICATIONS

CROSS-REFERENCE TO RELATED APPLICATION

This application claims priority to U.S. Provisional Patent Application No. 63/152,115, filed on Feb. 22, 2021, and entitled "POWER AND CONTROLLER INTEGRATED CIRCUITS FOR ELECTRIC VEHICLE APPLICATIONS," the entirety of which application is hereby incorporated by reference herein.

TECHNICAL FIELD

The disclosed subject matter relates to integrated circuits, and more particularly, to controller and power integrated circuits for electric vehicle applications.

BACKGROUND

Electric vehicles are becoming increasingly prevalent worldwide, and are poised to become one of the most common modes of transportation. With this pivot in transportation technology, there exist increasing power demands on electric vehicles and associated batteries. With increased power demand, sizes of conventional power conversion modules or other components, such as on-board chargers, DC-DC (direct-current to direct-current) converters, and traction inverters are increasing, which present significant packaging and integration challenges for electric vehicles. Further, many manufacturers are beginning to adopt 800-volt battery systems over 400-volt battery systems, further increasing the quantities of voltage and temperature sensors required for each parallel or series of connected battery cells in a battery pack. Additionally, conventional 800-volt battery systems require additional balancing circuits between battery cells.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that provide to controller and power integrated circuits for electric vehicle applications.

As alluded to above, vehicle electrical systems and/or components can be improved in various ways, and various embodiments are described herein to this end and/or other ends.

According to an embodiment, a system can comprise: a plurality of battery cells; and a plurality of application specific integrated circuits (ASICs) electrically coupled to the plurality of battery cells, wherein one or more ASICs of the plurality of ASICs comprises a respective power ASIC, and wherein the ASICs comprise respective bidirectional direct current to alternating current (DC-AC) converters and charge or discharge the plurality of battery cells.

According to another embodiment, a power application specific integrated circuit (ASIC) for a battery cell of a battery pack can comprise: a direct current to direct current (DC-DC) bidirectional power conversion module comprising a DC-DC converter, a direct current to alternating current (DC-AC) bidirectional power conversion module comprising a plurality of metal oxide semiconductor field effect transistors (MOSFETs), and a processor that executes computer executable components stored in memory, wherein the computer executable components comprise a bridge component that controls one or more DC-AC bridges, or one or more DC-DC bridges.

According to a yet another embodiment, a method can comprise: receiving, by a power application specific integrated circuit (ASIC), comprising a processor, for a battery cell of a battery pack, instruction data representative of an instruction to control one or more direct current to alternating current (DC-AC) bridges of the power ASIC or one or more direct current to direct current (DC-DC) bridges of the power ASIC; and based on the instruction, controlling, by the power ASIC, the one or more DC-AC bridges of the power ASIC using a DC-AC bidirectional power conversion module, of the power ASIC, comprising a plurality of metal oxide semiconductor field effect transistors (MOSFETs), or controlling, by the power ASIC, the one or more DC-DC bridges of the power ASIC using a DC-DC bidirectional power conversion module comprising a DC-DC converter.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Figure 1:
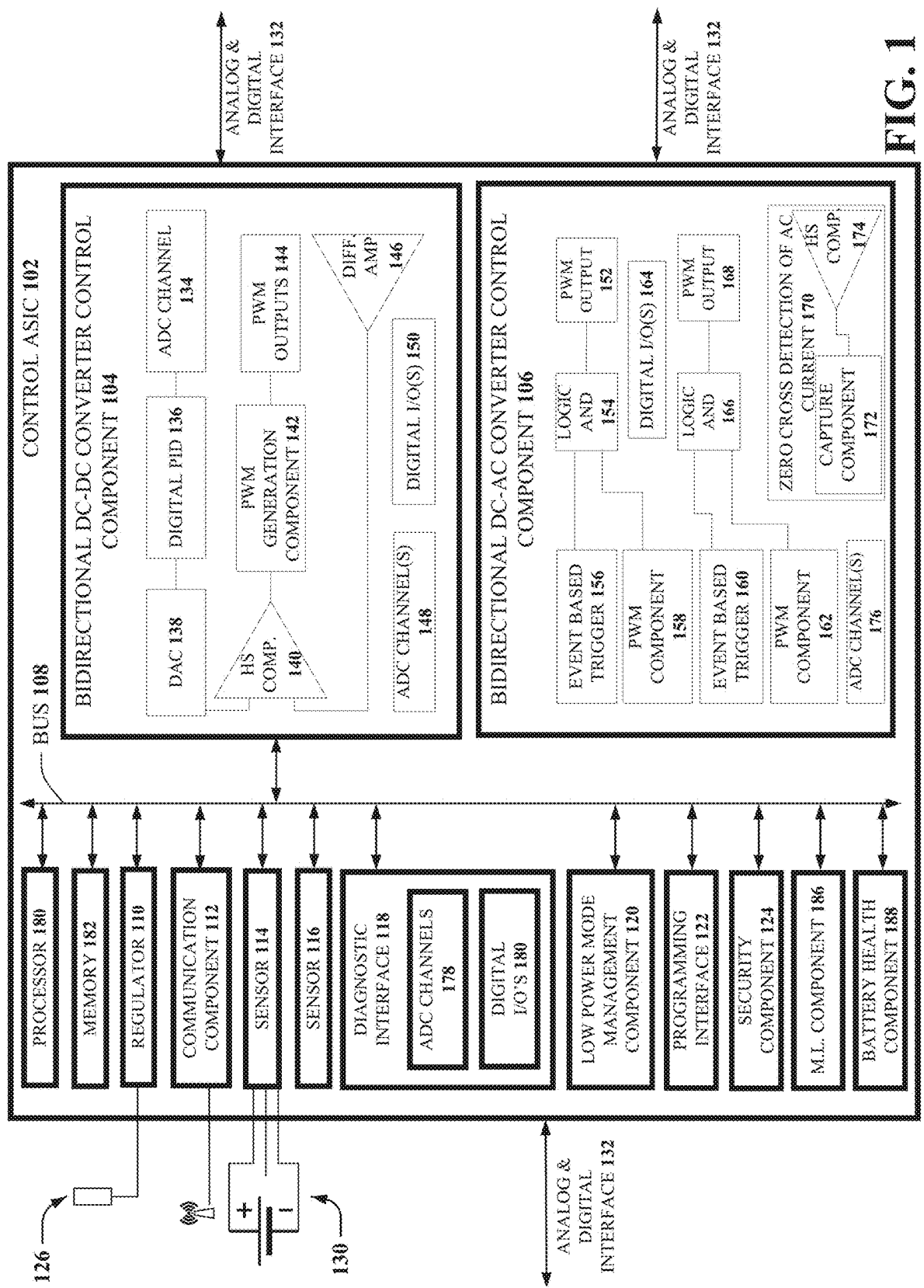
FIG. 1 illustrates a block diagram of an example, non-limiting control ASIC in accordance with one or more embodiments described herein.

FIG. 1 illustrates a block diagram of an example, non-limiting control ASIC 102 in accordance with one or more embodiments described herein. The control ASIC 102 can comprise one or more of a bidirectional DC-DC converter control component 104, one or more of a bidirectional DC-AC converter control component 106, a communication BUS 108, one or more regulators 110, a communication component 112, one or more sensors (e.g., a voltage sensor and/or a temperature sensor) 114, one or more sensors 116 (e.g., an impedance sensor), a diagnostic interface 118, low power mode management component 120, programming interface 122, and/or security component 124.

In various embodiments, one or more of bidirectional DC-DC converter control component 104, bidirectional DC-AC converter control component 106, BUS 108, regulator 110, communication component 112, sensor 114, sensor 116, diagnostic interface 118, low power mode management component 120, programming interface 122, and/or security component 124 can be communicatively or operably coupled to one another to perform one or more functions of the control ASIC 102. It is noted that the control ASIC 102 can be programmable and can be configured to said program. For instance, the control ASIC 102 can control voltage output (e.g., 12V, 16V, or another suitable voltage) of a power ASIC (e.g., power ASIC 202), and can then aggregate the output in parallel and/or in series to adjust voltage and/or current. In this regard, output voltage can be adjustable (e.g., software adjustable using a processor (e.g., processor 180) and a memory (e.g., memory 182) of the control ASIC 102.

In various embodiments, the component 104 can comprise an analog to digital converter (ADC) channel 134, digital proportional-integral-derivative (PID) controller 136, digital to analog converter (DAC) 138, high-speed (HS) comparator 140, pulse width modulation (PWM) generation component 142, PWM output 144, differential amplifier 146, ADC channels 148, and/or digital inputs/outputs (I/O) 150. It is noted that the control ASIC 102 can comprise one or a plurality of components 104, which can be communicatively or operably coupled (e.g., over a bus or wireless network) to one another to perform one or more functions of the component 104.

BUS 108 (e.g., an internal communication interface) can comprise one or more memory bus, memory controller, peripheral bus, external bus, local bus, a quantum bus, and/or another type of bus that can employ various bus architectures (e.g., industrial standard architecture (ISA), extended ISA (EISA), micro-channel architecture (MSA), intelligent drive electronics (IDE), advanced graphics port (AGP), VESA local bus (VLB), peripheral component interconnect (PCI), universal serial bus (USB), card bus, small computer systems interface (SCSI), firewire (IEEE 1394), etc.).

ADC channel 134 can measure DC-DC output voltage (e.g., from a power ASIC 202) for comparison with a digital reference voltage (e.g., using the digital PID controller 136). Output from the digital PID controller 136 can be provided to the DAC 138. A differential amplifier or HS comparator 140 can determine actual current and compare with the difference generated by a voltage controller. PWM generation component 142 can control MOSFET(s) in a primary stage or secondary stage (e.g., for the power ASIC 202). It is noted that the ADC channel 134 and/or ADC channels 148 can comprise a plurality of ADC channels. It is further noted that the component 104 can comprise a plurality of the DAC 138.

Figure 2:
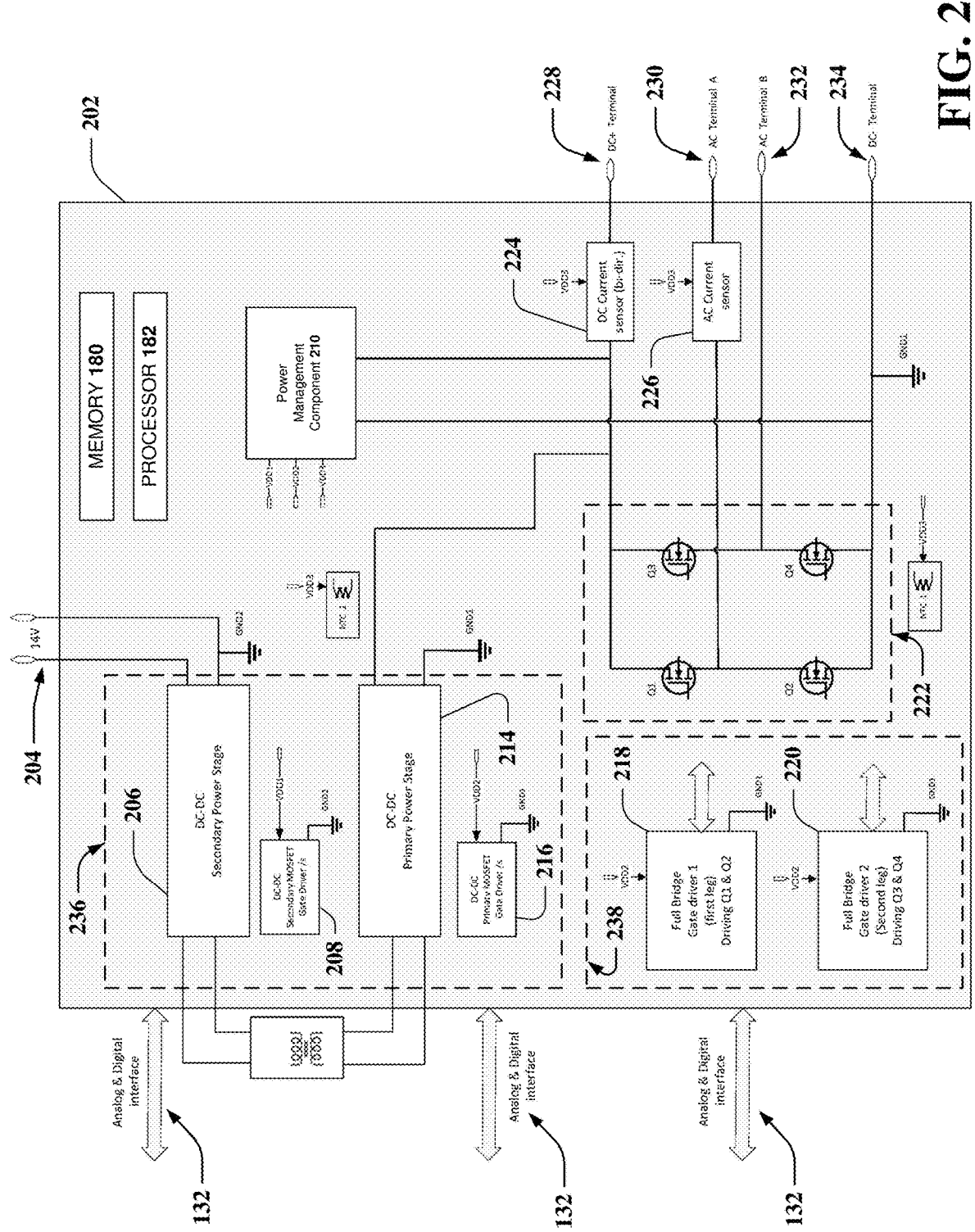
FIG. 2 illustrates a block diagram of an example, non-limiting power ASIC in accordance with one or more embodiments described herein.

The component 106 can comprise a PWM output 152, logic conjunction 154, event-based trigger 156, PWM 158, event-based trigger 160, PWM 162, logic conjunction 166, PWM output 168, zero-cross detection circuit 170 which can comprise a capture component 172 and/or one or more high-speed comparators 174, and/or ADC channel(s) 176. It is noted that the component 106 can control MOSFETs 222 (e.g., MOSFETs Q1, Q2, Q3, and Q4 as depicted in FIG. 2). In this regard, PWM output 152 can control Q1 and Q2, and PWM output 168 can control Q3 and Q4. The foregoing can be facilitated using corresponding half-bridge gate drivers (e.g., full bridge gate driver 218 and/or full bridge gate driver 220) of the power ASIC 202. In this regard, outputs from the PWM output 152 and/or PWM output 168 can be output to the power ASIC 202. To achieve the foregoing, event-based trigger 156 or 160 (e.g., timers) can be utilized. The zero-cross detection circuit 170 can utilize, for instance, a high-speed comparator 174 and a capture component 172 to capture rising and falling edges of AC current detected by AC current sensor 226. Output of the zero-cross detection can be utilized to control PWM components or event-based triggers to control a DC-AC stage. PWM outputs, PWM ADC channels (e.g., ADC channels 176), and/or digital I/O's can control corresponding drivers. It is noted that the foregoing operations can be programmable (e.g., using a processor 180 and a memory 182) of the control ASIC 102.

One or more of regulator 110 can receive input voltage 126 from a corresponding battery cell. In this regard, input to a regulator 110 is cell voltage, which can range from 1.5V to 5V, depending on the corresponding battery cell (e.g., battery cell 130), though other suitable battery cell and corresponding voltages can be utilized in embodiments herein. In various embodiments, the regulator 110 can regulate voltage to supply power to all internal peripherals of the control ASIC 102. It is noted that multiple regulators 110 can be utilized for supplying various voltages. The regulators 110 of the control ASIC 102 can run one or more (e.g., all) peripherals of the control ASIC 102, for instance, without degradation in respective functionalities. As an example, Table 1 below indicates two built-in regulators, in which regulator 1 power supply is used for all the digital I/O's and other peripherals inside the control ASIC 102, and regulator 2 voltage is used only for ADC channels for sensing all signals in order to satisfy accuracy requirements. In this regard, the control ASIC 102 can facilitate the mode transitions (e.g., Sleep to Wake-up, Wake-up to Sleep, etc.).

The control ASIC 102 can also wake-up through wireless communication. Exemplary voltages and amperages are illustrated in Table 1 below:

TABLE 1

Built-in power management specifications

| Requirement | Specification |
| --- | --- |
| Input voltage range | 1.5 V-5 V |
| Internal regulator 1 voltage | 3.3 V/5 V |
| Topology of regulator 1 | Buck-boost |
| Internal regulator 2 voltage | 3.3 V/5 V |
| Active current consumption | <200 mA |
| RF component sleep | <100 uA |
| Sleep mode current | <50 uA |
| Deep Sleep current | <20 uA |

It is noted that the control ASIC 102 can comprise a plurality of components 106.

The communication component 112 can comprise, for instance, a radiofrequency (RF) communication component. Other embodiments can utilize Bluetooth, Wi-Fi, cellular (e.g., 4G, 5G, 6G, etc.), NFC, or other suitable wireless communication protocols for communicating with other control ASICs, battery management systems, primary controllers, vehicles, or other components. In this regard, the control ASIC 102 can (e.g., via the communication component 112) transmit and/or receive signals between to/from a second control ASIC, which can be electrically coupled to a battery cell (e.g., other than the battery cell 130). The communication component 112 can additionally facilitate over the air (OTA) software updates for the control ASIC 102 and/or communicate with other battery cells of a battery pack (e.g., of a common battery pack).

The sensor 114 can comprise a voltage and/or a temperature sensor, which, according to an embodiment, can satisfy automotive safety integrity level (ASIL) B or ASIL D requirements. In this regard, it is noted that the sensor 114 can determine a voltage and/or a temperature of the battery cell 130. According to an embodiment, the sensor 116 (e.g., an impedance sensor) can determine AC impedance of the battery cell 130. The sensor 116 can utilize high-frequency sensing for voltage and/or current. In this regard, the battery health component 188 can determine a health of the battery cell 130 (e.g., such a state of age or degradation of the battery cell 130), according to a defined health metric, based on an output of the sensor 116. In various embodiments, the defined health metric can comprise a difference between a previous impedance of the battery cell 130 and a current impedance of the battery cell 130. In further embodiments, the defined health metric can comprise a difference between an impedance of the battery cell 130 and an impedance of a second battery cell (e.g., of a battery pack comprising the battery cell 130 and a second battery cell) (e.g., of a common battery pack). In one or more embodiments, the battery health component 188 can electrically decouple the battery cell 130 from a battery pack (e.g., or cause the power ASIC to electrically decouple the battery cell 130 from a battery pack) in response a determination that the health status of the battery cell 130 comprises a battery cell failure based on the output of the battery cell impedance sensor 116 being determined to satisfy a defined impedance criterion. In further embodiments, the defined health metric can be based on an output of the sensor 114 (e.g., a voltage and/or a temperature). In this regard, the battery health component 188 can determine a health of the battery cell 130 based on an output of the sensor 114 (e.g., according to a defined voltage and/or temperature metric).

It is noted that an analog & digital interface (ADI) 132 can be utilized to communicate with other control ASIC(s), power ASIC(s), other peripheral components, or other external circuits connected to or near the control ASIC 102 and/or power ASIC 202 (e.g., for the same battery cell 130). The diagnostic interface 118 can determine whether a problem or error exists in a corresponding control ASIC (e.g., control ASIC 102) and/or power ASIC (e.g., power ASIC 202) and further determine what (if any) associated actions should be taken. Such actions can be predefined and executed according to the determined problem or learned using machine learning (e.g., via the M.L. component 186 as later discussed in greater detail). In various embodiments, the diagnostic interface 118 can additionally diagnose circuits external to the battery cell 130. It is noted that the diagnostic interface 118 can utilize one or more ADC channels 178 and/or one or more digital I/O's 180. The foregoing can be utilized protect the battery cell 130, for instance, from a thermal runaway condition (e.g., by preventing such an event from occurring). A low power mode management component 120 can prevent battery cell drain (e.g., during transportation or a vehicle key-off condition), for instance, by disabling one or more control ASIC 102 components (e.g., communication component 112, diagnostic interface 118, sensor(s) 114, sensor(s) 116, component(s) 104, component(s) 106, and/or one or more power supplies of regulator(s) 110) not needed during a key-off condition. This can prevent a voltage reduction or discharge of the battery cell 130. The control ASIC 102 can utilize a programming interface 122. In various embodiments, the programming interface 122 can utilize Joint Test Action Group (JTAG). According to an embodiment, a security component 124 can be utilized to prevent tampering or hampering with a vehicle or a battery cell 130. In this regard, the security component 124 can encrypt signals transmitted via the communication component 112 and/or decrypt signals received via the communication component 112. The control ASIC 102 can comprise a memory (e.g., memory 182) which can store one or more computer/machine readable and/or executable components and/or instructions that, when executed by a processor (e.g., a classical processor, a quantum processor, etc.), can facilitate performance of operations defined by the executable component(s) and/or instruction(s). The memory can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. The control ASIC 102 can comprise a processor (e.g., processor 180) which can comprise one or more types of processors and/or electronic circuitry (e.g., a classical processor, graphics processor, a quantum processor, etc.) that can implement one or more computer and/or machine readable, writable, and/or executable components and/or instructions that can be stored on a memory. For example, the processor can perform various operations that can be specified by such computer and/or machine readable, writable, and/or executable components and/or instructions including, but not limited to, logic, control, input/output (I/O), arithmetic, and/or the like. In some embodiments, processors herein can comprise one or more central processing unit, multi-core processor, microprocessor, dual microprocessors, microcontroller, System on a Chip (SOC), array processor, vector processor, quantum processor, and/or another type of processor.

In various embodiments herein, the control ASIC 102 can (e.g., via the processor 180) facilitate various functions, such as ASIL D or ASIL B cell measurement (voltage, current and temperature), impedance spectroscopy, active balancing, state machine of a battery cell, thermal vent detection of a battery cell, cell level Sox (SOC, SOH), cell level safety SWCs, digital control implementation of isolated DC-DC converter (e.g., peak current control with output voltage regulation of DC-DC's) with bidirectional power flow, digital control implementation of DC-AC power stage with bidirectional power flow, and can enable capture component channels, PWM channels used for DC-DC and/or DC-AC power stage control implementations, diagnostic capabilities to monitor internal and external circuits, zero current crossing detection of AC current output of a DC-AC power block, low energy management mode(s), and/or other suitable functions.

Turning now to FIG. 2, there is illustrated a block diagram of an example, non-limiting power ASIC 202 in accordance with one or more embodiments described herein. The power ASIC 202 can comprise a processor (e.g., processor 180), memory (e.g., memory 182), power management component 210, DC current sensor 224, AC current sensor 226, DC positive terminal 228, AC terminal 230, AC terminal 232, DC negative terminal 234, DC-DC bidirectional power conversion module 236, and/or DC-AC bidirectional power conversion module 238.

In various embodiments, one or more of the processor (e.g., processor 180), memory (e.g., memory 182), power management component 210, DC current sensor 224, AC current sensor 226, DC positive terminal 228, AC terminal 230, AC terminal 232, DC negative terminal 234, DC-DC bidirectional power conversion module 236, and/or DC-AC bidirectional power conversion module 238 can be communicatively or operably coupled to one another to perform one or more functions of the power ASIC 202.

According to an embodiment, the DC-DC bidirectional power conversion module 236 can comprise a DC-DC primary power stage 214, DC-DC secondary power stage 206, MOSFET gate driver 208, MOSFET gate driver 216, and/or other suitable components. In various embodiments, the DC-AC bidirectional power conversion module 238 can comprise a full-bridge gate driver 218 and full-bridge gate driver 220. In some embodiments, the DC-AC bidirectional power conversion module 238 can comprise MOSFETs 222 (Q1-Q4). In other embodiments, the DC-AC bidirectional power conversion module 238 can comprise the MOSFETs 222. In various implementations, the MOSFETs 222 can be disconnected or connected in parallel or series.

As shown in FIG. 2, each full bridge gate driver (e.g., 218 and/or 220) (e.g., a bridge component) can control DC-AC bridges and/or DC-DC bridges. In this regard, such a bridge component can control respective legs (e.g., Q1 & Q2 can comprise a first leg, Q3 & Q4 can comprise a second leg) of a DC-AC power stage. Each full bridge gate driver receives PWM input from the external ADI 132. The DC+ (228) & DC− (234) terminals can comprise input power terminals with voltage ranging, for instance, from 1.5V to 5V (or other suitable voltages). The AC voltage of the DC-AC power stage can comprise, for instance, four possible modes depending on the switching of the full bridge MOSFETs, though other suitable modes or quantities of modes can be utilized. According to an example, if the input voltage between DC+ & DC− terminals comprises positive DC voltage (+$V_{DC}$), then the following modes can be utilized:

Active mode 1: Voltage between terminals A & B, VAB (voltage potential difference between A and B)=+$V_{DC}$ (when Q1 & Q4 are turned ON and Q2 & Q3 are turned OFF)

Active mode 2: Voltage between terminals A & B, VAB=−$V_{DC}$ (when Q2 & Q3 are turned ON and Q1 & Q4 are turned OFF)

Bypass mode: Voltage between terminals A & B, VAB=0V (when Q1 & Q3 are turned ON or Q2 & Q4 are turned ON)

High impedance mode: when Q3 & Q4 are turned ON while Q1 & Q2 are turned OFF or Q1 & Q2 turned ON while Q3 & Q4 turned OFF or all four MOSFET's (Q1, Q2, Q3 & Q4) are turned OFF In various embodiments, the bypass mode can comprise or cause an electrical isolation of a battery cell (e.g., battery cell 130) from other battery cells in a battery pack. Further, the high-impedance mode can comprise a defined reduced maximum electrical load on a battery cell (e.g., the battery cell 130). According to an embodiment, under normal operations of a DC-AC stage, active mode 1, 2, and bypass modes can be utilized. In various embodiments, the high impedance mode is generally not used so long as DC+ & DC− voltage is present, or so long as there is a voltage present on the AC terminals A & B. A default operating mode of the DC-AC power stage can comprise a bypass mode unless PWM input is received by external interface (e.g., via ADI 132) for any one of the OFF MOSFETs.

Full bridge gate driver 218 can be utilized for driving a first leg of the full bridge MOSFETs Q1 & Q2, whereas full bridge gate driver 220 can be utilized for driving a second leg of the full bridge MOSFETs Q3 & Q4. Because each gate driver can be responsible for driving each leg of the full bridge circuit, the condition of shoot-through should be avoided inside the gate driver. To mitigate shoot-through, four PWM pulses (for each full bridge MOSFET), for instance, can be applied by an external controller (e.g., control ASIC 102). The control ASIC 102 can be programmed to allow a dead time between Q1 & Q2 PWM pulses and Q3 & Q4 PWM pulses. However, if the external pulses comprise overlapped ON timings for Q1 & Q2 PWM pulses or Q3 & Q4 PWM pules, respectively, the corresponding gate driver internal hardware circuits can detect the overlap of PWM ON time and keep the full bridge circuit in a bypass mode, and also provide diagnostics through the external ADI 132. In another embodiment, only two PWM pulses, for instance, are applied by the external controller (e.g., control ASIC 102) (one PWM for each leg), then a corresponding gate driver can generate complementary PWM pulse(s) with sufficient dead time to avoid a shoot through problem. In case of two PWM input's, the gate drivers control logic can correspond to Table 2 below:

TABLE 2

Full bridge DC-AC Gate drivers logic

| Gate driver 1 PWM I/P | Gate driver 2 PWM I/P | Gate driver 1 Enable I/P | Gate driver 2 Enable I/P | Q1 | Q2 | Q3 | Q4 |
|---|---|---|---|---|---|---|---|
| 1 | 0 | 1 | 1 | ON | OFF | OFF | ON |
| 0 | 1 | 1 | 1 | OFF | ON | ON | OFF |
| 1 | 1 | X | X | ON | OFF | ON | OFF |
| 0 | 0 | X | X | OFF | ON | OFF | ON |
| HZ | X | X | X | OFF/ON | ON/OFF | OFF/ON | ON/OFF |
| X | HZ | X | X | OFF/ON | ON/OFF | OFF/ON | ON/OFF |
| HZ | HZ | X | X | OFF/ON | ON/OFF | OFF/ON | ON/OFF |

It is noted that a DC-AC full bridge power stage can be realized with four N-channel power MOSFETs 222 or combination of P and N channel MOSFETs 222. According to an example, if a battery cell (e.g., a battery cell 306) were to fail, a control ASIC (e.g., control ASIC 102) can cause the power ASIC 202 to cause Q2 and Q4 to turn ON so that power can be bypassed through Q2 and Q4. In this regard, if a power ASIC 202 were to fail, a corresponding vehicle can continue to drive under electric power despite the failure. In another example, if Q1 and Q2 are turned ON, a positive voltage at AC terminal 230 can be realized and a negative voltage at AC terminal 232 can be realized (e.g., +/−3.6V, 0V, or another suitable voltage). The bridge configuration of the power ASIC 202 affords such flexibility. Using such control, battery cells herein (e.g., of a battery pack) can be bypassed, which can avoid a cell balancing step. Regenerative braking is also enabled, for instance, because the bridge is bidirectional. It is noted that a direction of energy flow, cell balancing, or other functions herein can be implemented using artificial intelligence based on, for instance, a machine-learning model.

The power management component 210 inside the power ASIC 202 can be utilized in order to supply power to the full bridge gate drivers 218 and/or 220, DC-DC power stage MOSFET gate drivers 208 or 216, and/or to the sensors (e.g., 224 and/or 226). The AC current sensor 226 and DC current sensor 224 can measure the AC current and/or the DC current, respectively, to provide feedback to the control ASIC 102 for the regulated operation of the series connected DC-AC power stages (e.g., from neighboring battery cells comprising similar control ASICs and power ASICs). Because the DC-AC power stage can be bidirectional, energy can be readily transferred from DC side to AC side, which can be used during vehicle-to-grid power transfer.

According to an embodiment, the power ASIC 202 can also comprise a built-in DC-DC power converter (e.g., DC-DC bidirectional power conversion module 236), which can provide power to vehicle low-voltage (LV) & medium-voltage (MV) loads. Because the topology of the DC-DC can be isolated, the primary & secondary power stages of the DC-DC can be placed inside the power ASIC 202. The input voltage from DC+ & DC− terminals (228 and 234, respectively) can be applied to the DC-DC primary power stage. Galvanic isolation can be provided by external connections to a planar transformer. The topologies of the DC-DC power stages can comprise fly back, forward, half-bridge resonant, full-bridge resonant, phase shifted full bridge, or dual active bridge converters. In various embodiments, the DC-DC primary & secondary gate drivers (e.g., 216 and 208, respectively) can be integrated inside the DC-DC power stage to drive the primary and secondary side of the DC-DC MOSFET's. In various embodiments, the DC-DC converter (e.g., DC-DC bidirectional power conversion module 236) can facilitate a fixed frequency duty cycle control, fixed frequency phase shift control or variable frequency with fixed duty cycle, or a combination of the foregoing. The LV output of the DC-DC secondary power stage 206 can be connected with similar battery cells or combinations of battery cell LV (e.g., 12V or 14V) outputs in parallel combination to provide the sufficient power to LV loads inside a corresponding vehicle. The LV output of multiple battery cells herein can also be connected in series to provide power to medium voltage (e.g., 48V) loads inside a corresponding vehicle.

It is noted that the power ASIC 202 can be controlled by the control ASIC 102, for instance, via the ADI 132. In various embodiments herein, capabilities of the power ASIC 202 can comprise active balancing of the battery cell 130, for instance, by transferring energy between the battery cell 130 and other battery cells of a corresponding battery pack (e.g., through DC-DC or DC-AC power stages of the corresponding battery cells that need to be balanced). In this regard, it is noted that the control ASIC 102 can comprise active balancing logics. This can improve battery cell 130 life cycle and protect battery cells from overcharging or discharge, which otherwise can lead to hazardous conditions (e.g., thermal runaway, explosion, etc.) According to an embodiment, the power ASIC 202 can enable a corresponding battery cell to output different states (e.g., −Vcell, +Vcell, or bypass) depending on a request from a primary battery management system (BMS) to meet vehicle power needs. The foregoing can allow corresponding battery cells to be connected all in series to create one high-voltage (HV) string during charging, and can also generate a sinewave during operation mode. In an example, a default mode of such a smart battery cell can comprise a bypass mode, which can make the smart battery cell safer during transport and assembly. The bypass mode can disconnect an aged or defective battery cell (e.g., combination of battery cells and ASICs herein) from the complete battery pack without interrupting the vehicle performance and can protect the battery cell from overcharge and/or discharge and avoid thermal hazards. According to an embodiment, cell bypass operations can be used at an end of a charging process. In an implementation, when one of the single cells of a battery pack reaches maximum voltage, charging current can be decreased to a low voltage. It is noted that any battery cell can be bypassed whenever it reaches maximum charge or voltage, for instance, in order to compensate for the efficiency of a lesser-charged battery cell.

In various embodiments herein, the power ASIC 202 and/or control ASIC 102 can comprise a printed circuit board (PCB) that can be mounted directly on each battery cell, which can accordingly improve cell and/or battery pack performance. Thus, life cycle of the battery cell can increase and improve the redundancy for LV (e.g., 12V or 14V), MV (e.g., 48V), and HV (e.g., 400V or 800V) power availability, charging, and/or motor control in the vehicle. For example, the power ASIC 202 and control ASIC 102 can supply current (e.g., AC current or DC current, depending on motor type) to an electric motor of a vehicle comprising the power ASIC 202 and control ASIC 102. Further, total weight of a battery pack and associated vehicle can be reduced. It is noted that power ASIC 202 can comprise a cell bypass mode, thus providing AC power a vehicle during driving and/or charging from an AC inlet or DC inlet, vehicle to grid power transfer, DC-DC converter power supply to the vehicle, LV and MV loads, and/or power transfer from a 14V DC side to a battery cell when it is requested or when the voltage on the LV side increases to more than 14V for an extended period of time. It is noted that LV such as 14V can be utilized for vehicle components such as headlights, wiper motors, window motors, radios, fans, mobile device chargers, power steering motors, or other suitable vehicle components.

The foregoing ASIC(s) can allow for removal of a dedicated on-board vehicle charger, traction inverter, DC-DC converter from a vehicle, because such functionalities can be provided by the control ASIC 102 and power ASIC 202, which can be mounted directly to battery cell(s). The foregoing also facilitates easier assembly of battery packs and corresponding vehicles.

It is noted that various DC voltages can be output, such as 14V, 48V, or 400V. 48V outputs can be used, for instance, in plug-in hybrid electric vehicle (PHEV) vehicles or in active suspension systems. For such loads, DC-DC outputs can be connected in a series combination, and the DC-DC power stages can operate in a current-controlled mode. When DC-DC power stages are operated in series, the same current exists in multiple DC-DCs. DC-DC is bidirectional. For example, if a solar panel is mounted on a vehicle, ASICs herein can generate power for a 12V network, which can be used to charge each cell of a corresponding battery pack. In this regard, battery pack cells (e.g., 3.6V cells) can be charged using 12V or 14V DC. According to an embodiment, if one cell of a battery pack comprises 3.6V and another cell comprises 3.8V, the cell at 3.8V can charge the 3.6V cell using the DC-DC power stages inside power ASIC 202 connected on both battery cells. Thus, DC-DC power stages of the power ASIC 202 connected to the 3.8V cell can convert power from 3.8V to 14V and the DC-DC stages of the power ASIC 202 of the 3.6V cell convert power from 14V to 3.6V in order to balance the voltage (e.g., voltage balancing).

It is noted that the power ASIC 202 can comprise various capabilities, such as DC-AC power conversion for driving (e.g., AC voltage, current, and frequency control for an electric motor of a vehicle during driving and vehicle to grid power transfer during stand still), DC-AC reverse power mode for regenerative braking and AC charging (e.g., AC voltage, current, and/or frequency control for AC charging from grid), DC-AC conversion during DC fast-charging, DC-DC power conversion from a battery cell to 14V loads, series connected (e.g., a series of at least three) 14V DC-DCs to provide power to 48V loads, DC-DC reverse power transfer (e.g., from 14V loads or 48V loads to battery cells (e.g., using solar panels placed on a vehicle), and/or monitoring of AC and DC current and/or voltage.

Figure 3:
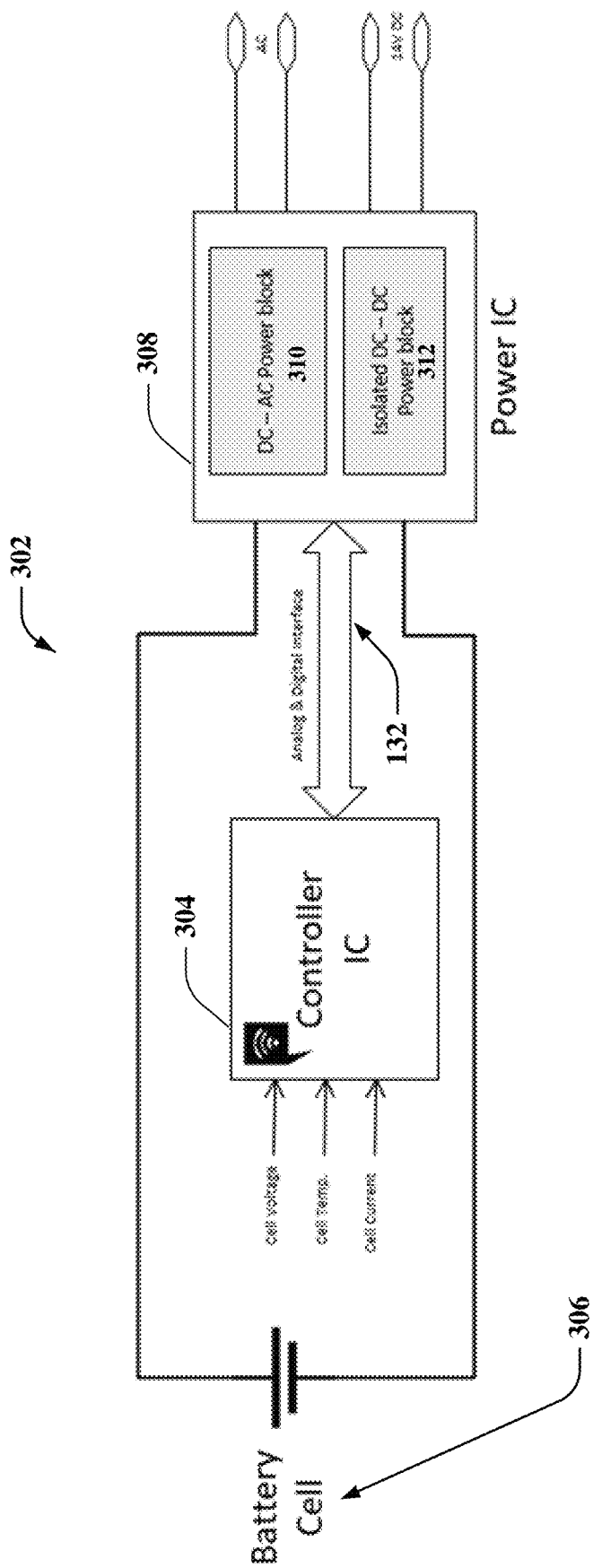
FIG. 3 illustrates a block diagram of an example, non-limiting smart battery pack in accordance with one or more embodiments described herein.

FIG. 3 illustrates an exemplary smart battery pack 302 in accordance with one or more embodiments described herein. Pack 302 can comprise a plurality of control ASICs 304, a plurality of battery cells 306, and a plurality of power ASIC 308. It is noted that the control ASIC 304 can be similar to the control ASIC 102, and the power ASIC 308 can be similar to the power ASIC 202. In various embodiments, battery packs herein can comprise a power ASIC (e.g., power ASIC 308) and a control ASIC (e.g., control ASIC 304) as a single integrated chip/circuit (e.g., a single ASIC).

By utilizing pack 302, a level of an output sinusoidal voltage can be determined for every single battery cell (e.g., battery cell 306) in a complete battery pack 302. In this regard, a conventional, standalone inverter can be replaced with DC-AC power stages connected to each battery cell 306. A conventional on-board charger & traction inverter can be replaced with a single circuit for each battery cell 306. In this regard, the DC-AC power stages connected to each battery cell 306 can also be used for AC charging. Outputs of DC-AC power stages for each battery cell 306 can be connected in series, and all the series cells can be divided into, for instance, three strings to generate three-phase AC voltage for an electric motor during driving. The operation can be similar in a reverse direction when, for instance, external three-phase voltage is applied from a grid to charge the individual battery cells 306. The foregoing can eliminate a need for a standalone on-board charger & traction inverter. Similarly, a standalone DC-DC used in conventional electric vehicles can be replaced with DC-DC converters connected to each battery cell 306.

In various embodiments, the power ASIC 308 can comprise DC-AC and/or DC-DC bidirectional power stages. The DC-AC power block can be used for providing the power to an electric vehicle during driving and/or used for charging when the vehicle is plugged in, either from an AC inlet or DC inlet. The DC-DC power block can comprise an isolated DC-DC converter with, for instance, 14V DC output to supply power to the vehicle LV loads. Additionally, the power ASIC 308 can transfer power from a 14V DC side to the battery cell 306 whenever it is requested (e.g., by a control ASIC 304) or whenever the voltage on the LV side increases to more than 14V for an extended (e.g., a defined) period time.

Additionally, battery cell-related parameters, such as cell voltage, temperature, currents, or other suitable parameters, can be transmitted (e.g., via wireless signals) which can reduce or eliminate hardwired connections between voltage & temperature sensors (e.g., CVTN's) to a centralized BMS. In various embodiments, the battery cell 306 along with complete DC-AC and/or DC-DC power stages and the control ASIC (e.g., control ASIC 304) can transmit cell-related information (e.g., cell voltage, cell temperature, and/or cell current) using such wireless communication.

Figure 4:
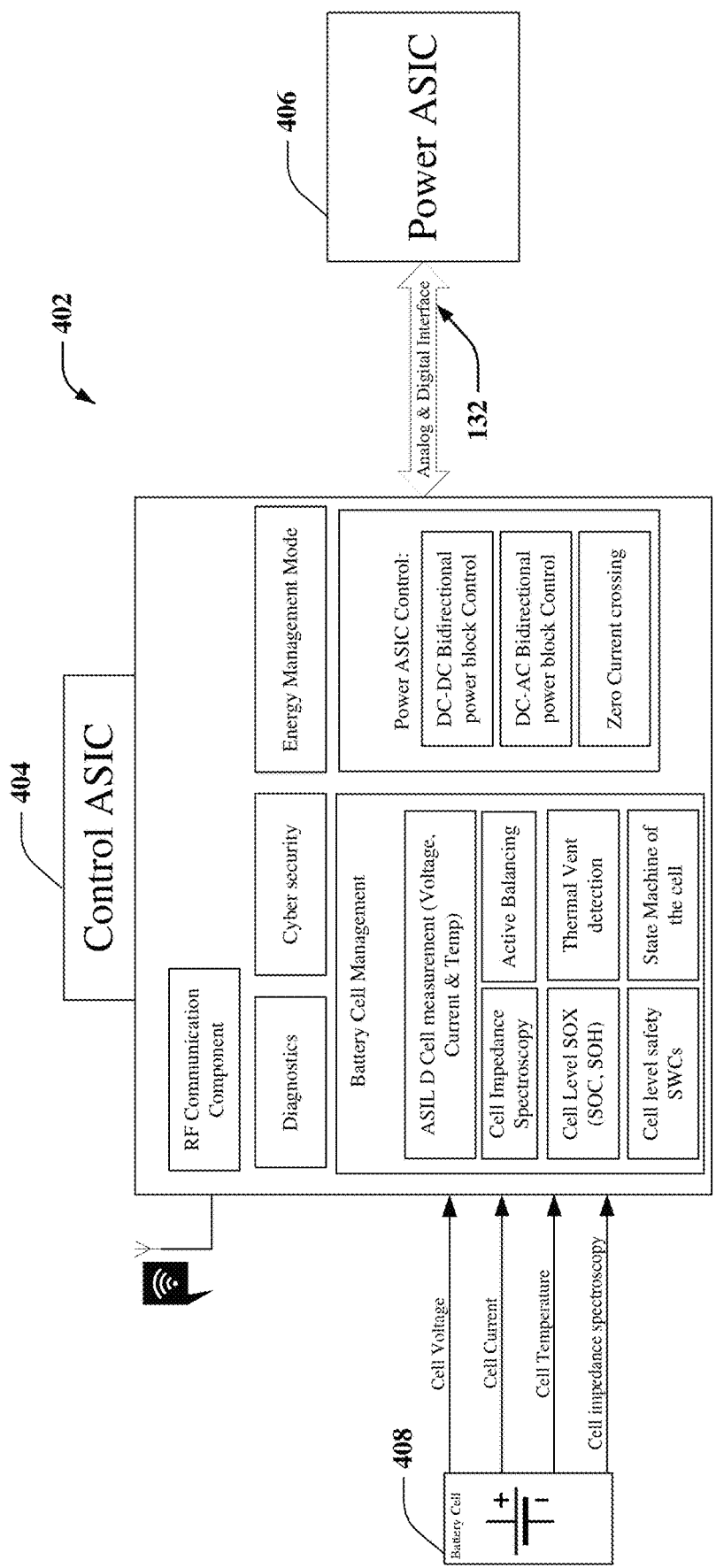
FIG. 4 illustrates a block diagram of an example, non-limiting battery system in accordance with one or more embodiments described herein.

FIG. 4 illustrates a block diagram of an exemplary battery system comprising a printed circuit board (PCB) 402 in accordance with various embodiments herein. The PCB 402 can comprise a control ASIC 404, power ASIC 406, and battery cell 408. The control ASIC 404 can, for instance, be similar to the control ASIC 102. Battery cell 408 can be similar to battery cell 130, and power ASIC 406 can be similar to power ASIC 202. The control ASIC 404 can comprise a Central Processing Unit (CPU) (e.g., processor 180) which can comprise a single or multi-core processor. The CPU, in conjunction with a memory (e.g., memory 182), can facilitate software functionalities, the cell level safety, and/or diagnostics of battery management and the power ASIC 406 at a battery-cell level. In various embodiments, the memory can store logged data, and the CPU can support firmware updates, for instance, OTA.

Figure 6:
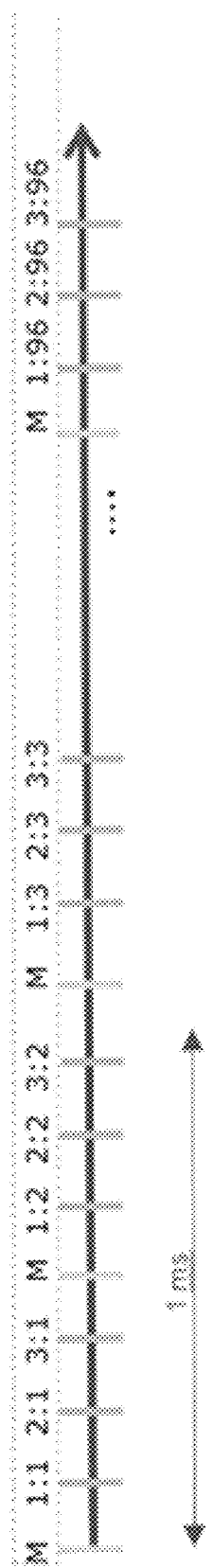
FIG. 6 illustrates an exemplary, non-limiting broadcasting sequence in accordance with one or more embodiments described herein.

The control ASIC 404 can comprise a communication component (e.g., a non-galvanic wireless communication component) (e.g., communication component 112) which can enable a smart battery cell (e.g., a battery cell coupled to PCB 402) to communicate between each other smart battery cells and/or exchange data with a primary control unit (e.g., a primary PCB 402). The communication component 112 can operate independently from a main CPU of the PCB 402, and can therefore comprise a separate, dedicated CPU. An associated communication protocol can comprise a periodic wireless broadcast of data. As an example, the primary control unit can broadcast every 1 ms. See, e.g., FIG. 6 which illustrates three secondary units broadcast between every primary broadcast. One or more sensors of the control ASIC 404 can continuously monitor battery cell voltage, temperature, and current (e.g., with ASIL D). In this regard, ASIL D hardware/software can be embedded into the control ASIC 404. Other embodiments can utilize ASIL B. The control ASIC 404 can determine battery cell SoX (e.g., SoC and SoH). One or more sensors of the control ASIC 404 can enable the ASIC 404 to continuously monitor battery cell AC impedance by injecting an AC current pulse, which can enable monitoring of changes in battery cell properties under different usage and storage conditions. According to an embodiment, the control ASIC 404 can facilitate cell to cell active balancing functionality, which can be achieved by transferring energy from a more-charged battery cell to a lesser-charged battery cell through a corresponding power ASIC 406 (e.g., by controlling the power ASIC 406 output.) The control ASIC 404 can monitor various battery cell parameters (e.g., voltage, current, temperature, and/or AC impedance) continuously. Communication error and/or control ASIC 102 monitoring can be used to facilitate thermal vent detection of a battery cell.

The control ASIC 404 can regulate the DC-DC power stages through the ADI 132. In various embodiments, the control ASIC 404 can sense analog output voltage of the DC-DC through an ADC channel, compare it with an internal reference, and generate a current reference signal using a digital PID control loop. The digital current reference can then be converted to an analog current reference and compared with an actual primary current sensed by differential amplifier. According to an embodiment, the differential amplifier gain can be controllable, for instance, through external components. Output of analog current comparator can be used as an input to the PWM component to generate the required PWM pulses for the primary and secondary power stages. Thus, by using a built-in analog amplifier, the output signal from analog amplifier can be used as a reference for primary peak current control. Digital control algorithms can be implemented to control the power flow in both directions. All suitable peripherals, such as differential amplifiers, high speed analog comparators, DAC (Digital to Analog Converter), digital PID, timers, ADC channels, and digital I/O's required can be supported by the control ASIC 404.

The control ASIC 404 can control/diagnose power flow of the DC-DC and DC-AC power stages, bidirectionally, to fulfill vehicle operational needs, for instance, based on a received request from the primary BMS, other vehicle engine control unit, or another PCB 402. The control ASIC 404 can configure battery cell output, for instance, to three different voltage states such as +Vcell, −Vcell, and zero voltage, or a high impedance state to meet the vehicle power needs or to enable active balancing between battery cells. With this functionality, the control ASIC 404 can safely isolate aged or defective battery cells from the complete HV string without interrupting vehicle operation, for instance, by controlling its corresponding power ASIC 406 to a bypass mode. In various embodiments, the control ASIC 404 can determine zero current crossing of current rising and falling edges for the DC-AC power block output, which can be achieved by a built-in HS comparator embedded into the control ASIC 404. It is noted that the control ASIC 404 can be compliant to security ISO/SAE 21434 CAL4, AES, and/or ACL level(s). According to an embodiment, security levels ranging from CAL1 to CAL4 can be adopted. In various embodiments, the control ASIC 404 can comprise a built-in power management unit/component that can enable various low-power management modes. Additionally, the control ASIC 404 can "wake-up" from various different sleep modes (e.g., through wireless communication or through any other hardwired interface.)

Figure 5:
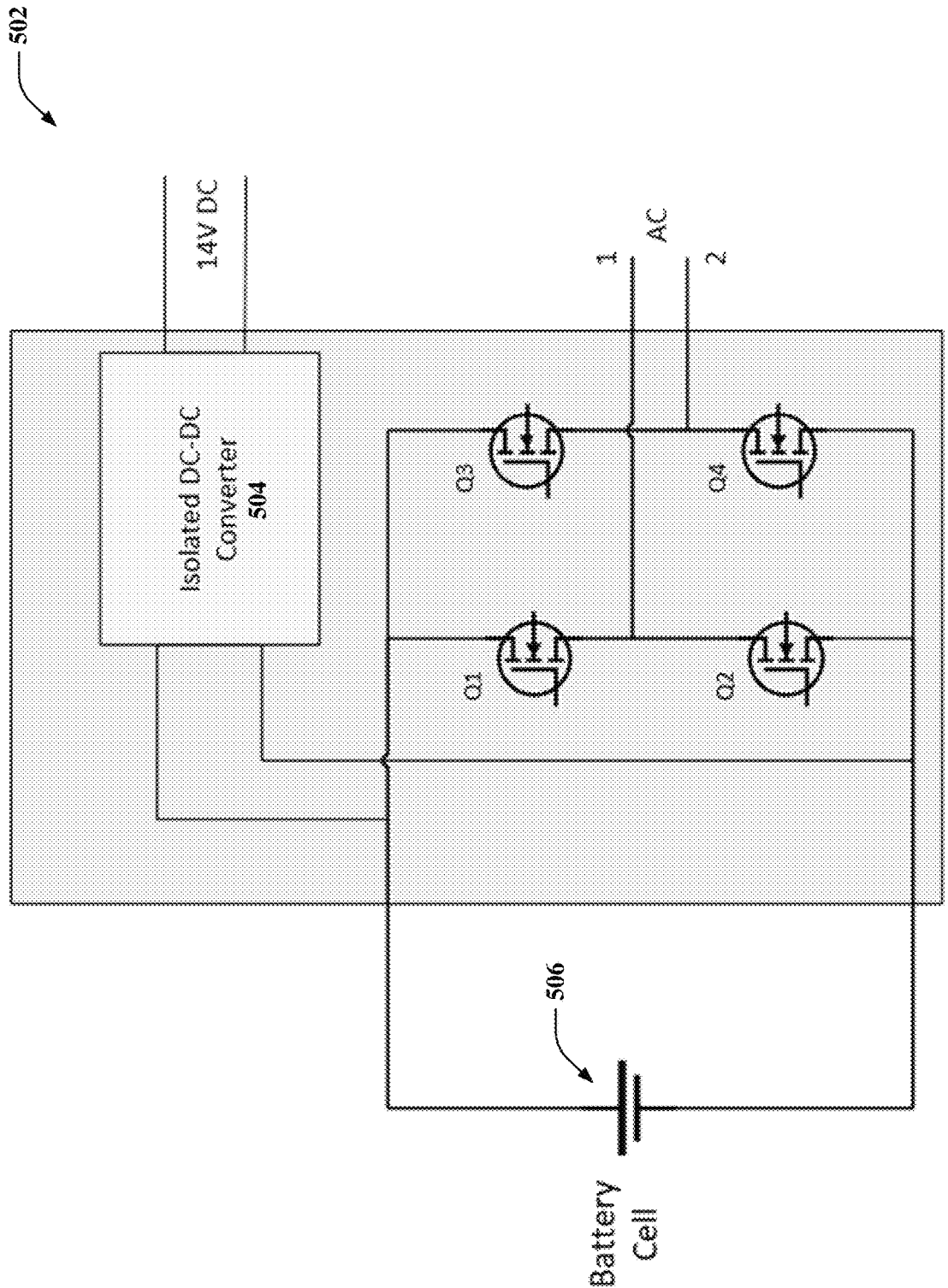
FIG. 5 illustrates a block diagram of an example, non-limiting group of MOSFETs in accordance with one or more embodiments described herein.

FIG. 5 illustrates a functional diagram of a power ASIC block 502. A battery cell 506 and DC-DC converter 504 are also illustrated herein. According to an embodiment, a DC-AC power stage can comprise four MOSFETs (Q1, Q2, Q3, and Q4) which can be turned ON or OFF based on a usage mode of a vehicle. For instance, when Q1 and Q4 are turned ON, the AC voltage between terminals 1 & 2 can be +Vcell. When Q2 and Q3 are turned ON, the AC voltage between terminals 1 & 2 can be −Vcell. Additionally, the DC-AC block can continuously operate in a bypass mode. In this regard, either Q1 and Q3, or Q2 and Q4, are continuously turned ON which makes the voltage between terminals 1 & 2 zero. This can be a default mode of the DC-AC power stage under any failures, (e.g., inside a power ASIC, if there is any failure inside a control ASIC, or if the battery cell is damaged.)

Various embodiments herein can employ artificial-intelligence or machine learning systems and techniques (e.g., via M.L. component 186) to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following. It is noted that control ASICs, power ASICs, or smart battery systems herein can comprise a M.L. component 186 which can employ an artificial intelligence (AI) model and/or a machine learning (ML) model that can learn to perform the above or below described functions (e.g., via training using historical training data and/or feedback data).

In some embodiments, an artificial intelligence component can comprise an AI and/or ML model that can be trained (e.g., via supervised and/or unsupervised techniques) to perform the above-described functions using historical training data comprising various context conditions that correspond to various battery management operations. In this example, such an AI and/or ML model can further learn (e.g., via supervised and/or unsupervised techniques) to perform the above-described functions using training data comprising feedback data, where such feedback data can be collected and/or stored (e.g., in memory) by an artificial intelligence component. In this example, such feedback data can comprise the various instructions described above/below that can be input, for instance, to an ASIC or system herein, over time in response to observed/stored context-based information.

Artificial intelligence components herein can initiate an operation associated with a battery cell or battery pack based on a defined level of confidence determined using information (e.g., feedback data). For example, based on learning to perform such functions described above using the above defined feedback data, an artificial intelligence component herein can initiate an operation associated with the vehicle if it determines, for instance, based on such feedback data, that a battery pack is damaged and in need of isolation or if charge between battery cells should be balanced.

In an embodiment, an artificial intelligence component herein can perform a utility-based analysis that factors cost of initiating the above-described operations versus benefit. In this embodiment, an artificial intelligence component can use one or more additional context conditions to determine whether a battery management action should be taken.

Figure 7:
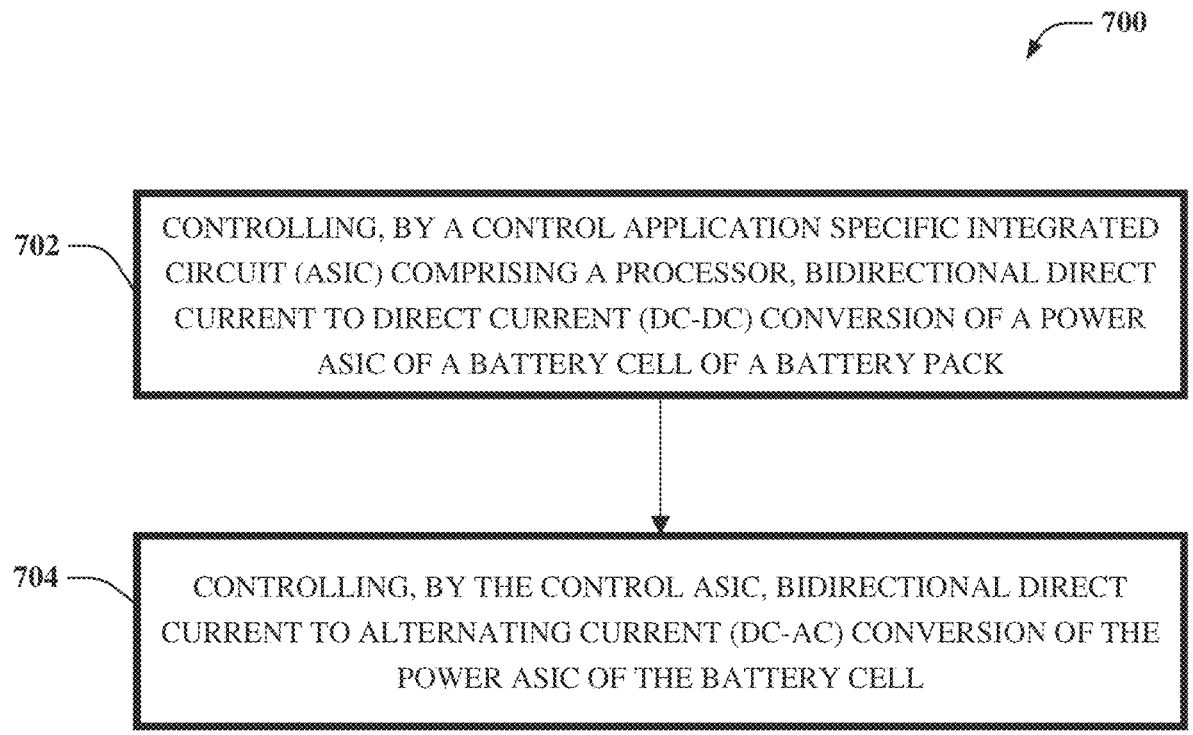
FIG. 7 illustrates a block flow diagram of an example, non-limiting process associated with a control ASIC in accordance with one or more embodiments described herein.

FIG. 7 illustrates a block flow diagram for a process 700 associated with a control ASIC in accordance with one or more embodiments described herein. At 702, the process 700 can comprise controlling, by a control application specific integrated circuit (ASIC) comprising a processor, bidirectional direct current to direct current (DC-DC) conversion of a power ASIC of a battery cell of a battery pack. At 704, the process 700 can comprise controlling, by the control ASIC, bidirectional direct current to alternating current (DC-AC) conversion of the power ASIC of the battery cell.

Figure 8:
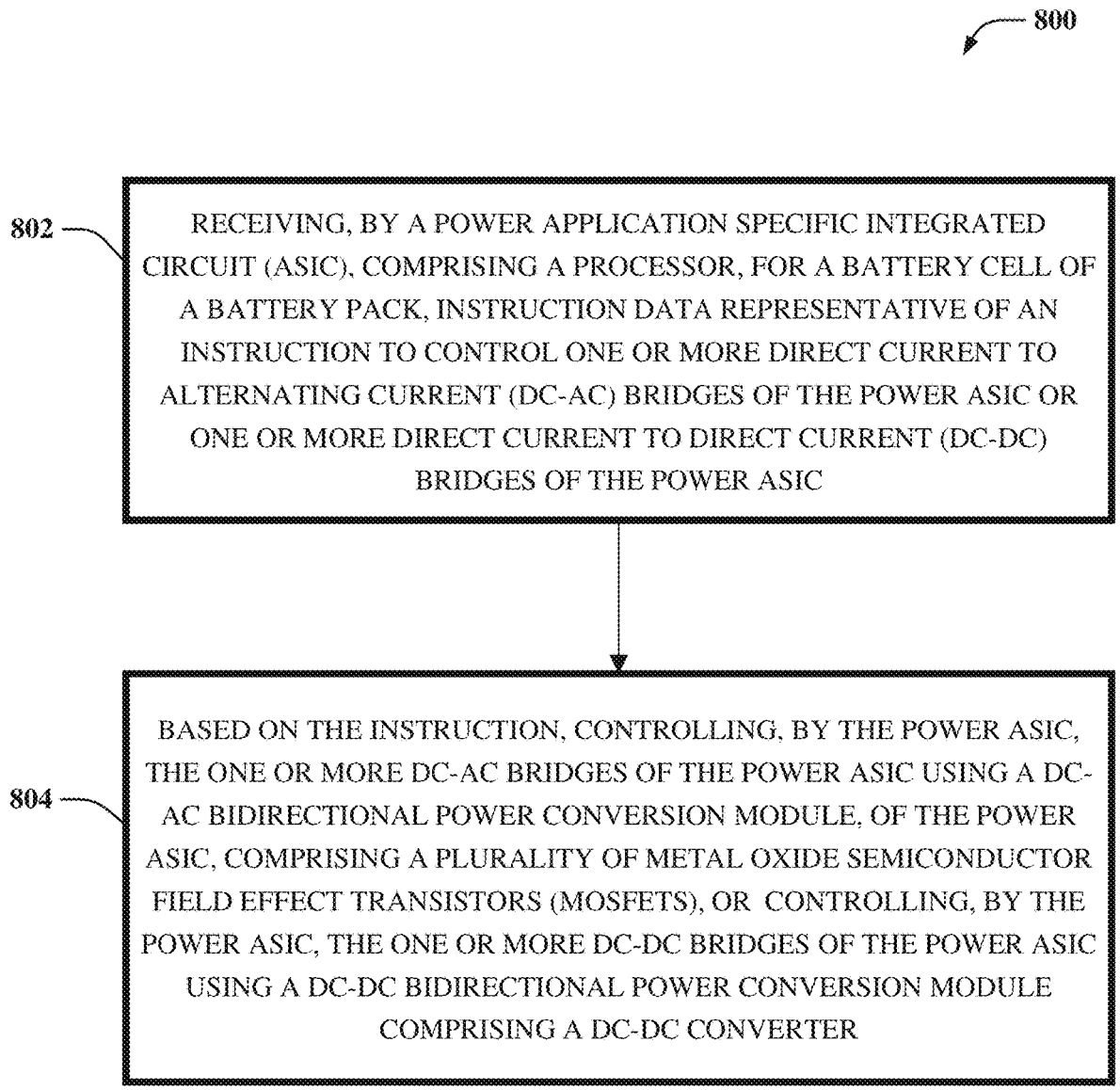
FIG. 8 illustrates a block flow diagram of an example, non-limiting process associated with a power ASIC in accordance with one or more embodiments described herein.

FIG. 8 illustrates a block flow diagram for a process 800 associated with a power ASIC in accordance with one or more embodiments described herein. At 802, the process 800 can comprise receiving, by a power application specific integrated circuit (ASIC), comprising a processor, for a battery cell of a battery pack, instruction data representative of an instruction to control one or more direct current to alternating current (DC-AC) bridges of the power ASIC or one or more direct current to direct current (DC-DC) bridges of the power ASIC. At 804, the process 800 can comprise based on the instruction, controlling, by the power ASIC, the one or more DC-AC bridges of the power ASIC using a DC-AC bidirectional power conversion module, of the power ASIC, comprising a plurality of metal oxide semiconductor field effect transistors (MOSFETs), or controlling, by the power ASIC, the one or more DC-DC bridges of the power ASIC using a DC-DC bidirectional power conversion module comprising a DC-DC converter.

To facilitate the above-described functions, an artificial intelligence component can perform classifications, correlations, inferences, and/or expressions associated with principles of artificial intelligence. For instance, an artificial intelligence component herein can employ an automatic classification system and/or an automatic classification. In one example, an artificial intelligence component can employ a probabilistic and/or statistical-based analysis (e.g., factoring into the analysis utilities and costs) to learn and/or generate inferences. An artificial intelligence component can employ any suitable machine-learning based techniques, statistical-based techniques and/or probabilistic-based techniques. For example, an artificial intelligence component can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, an artificial intelligence component can perform a set of machine-learning computations. For instance, an artificial intelligence component can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

ASICS and/or systems described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, ASICS or systems herein (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, ASICs or systems herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, an ASIC herein can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, ASICs or systems herein can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

ASICs and/or systems herein can comprise one or more computer and/or machine readable, writable, and/or executable components and/or instructions that, when executed by processor (e.g., a classical processor, a quantum processor, etc.), can facilitate performance of operations defined by such component(s) and/or instruction(s). Further, in numerous embodiments, any component associated with an ASIC or system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). For example, any component associated with ASICs or systems as disclosed herein (e.g., communicatively, electronically, operatively, and/or optically coupled with and/or employed by a system described herein), can comprise such computer and/or machine readable, writable, and/or executable component(s) and/or instruction(s). Consequently, according to numerous embodiments, ASICs, or systems herein and/or any components associated therewith as disclosed herein, can employ a processor to execute such computer and/or machine readable, writable, and/or executable component(s) and/or instruction(s) to facilitate performance of one or more operations described herein with reference to system herein and/or any such components associated therewith.

ASICs and/or systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system herein can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 9:
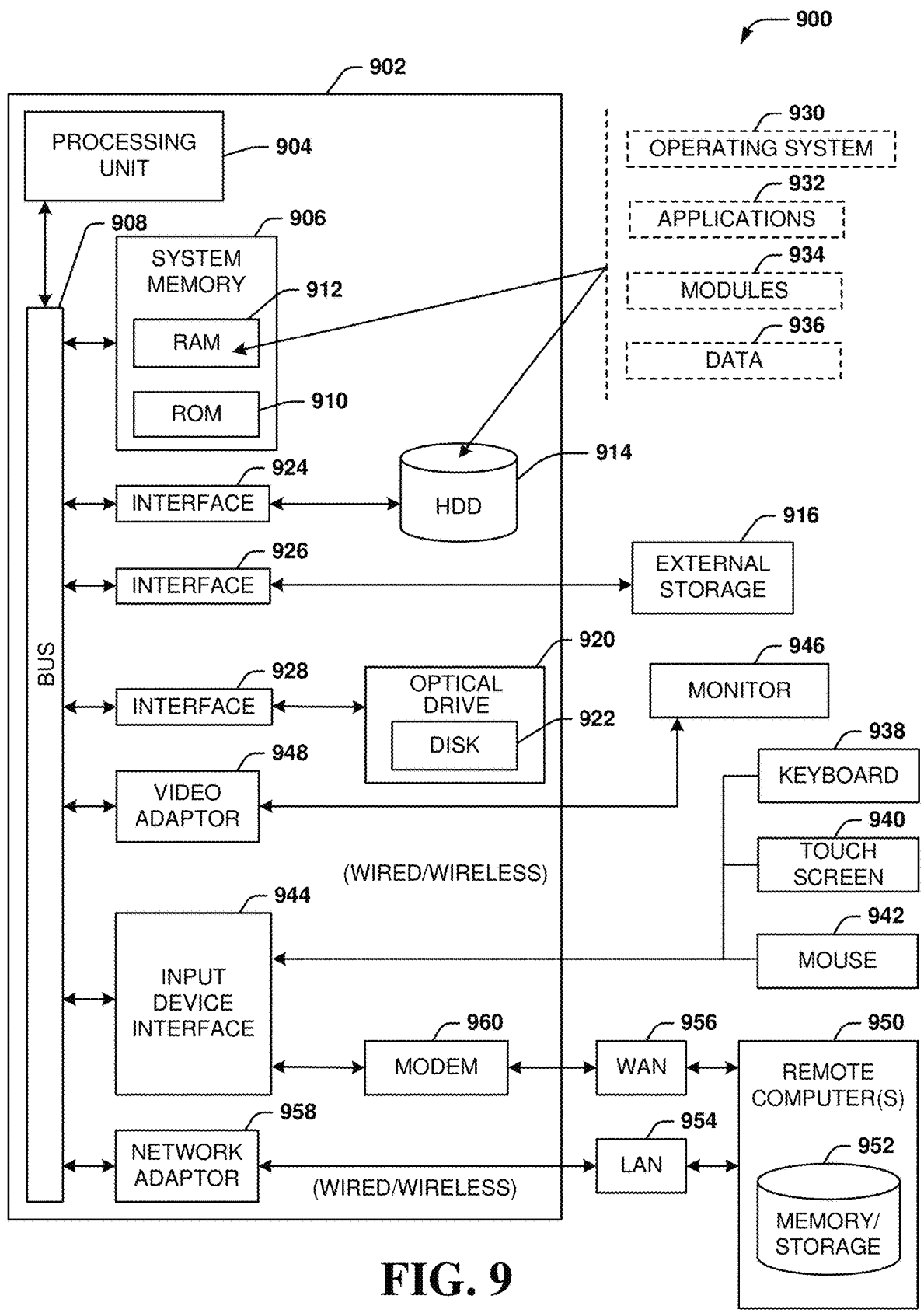
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program components and/or as a combination of hardware and software.

Generally, program components include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
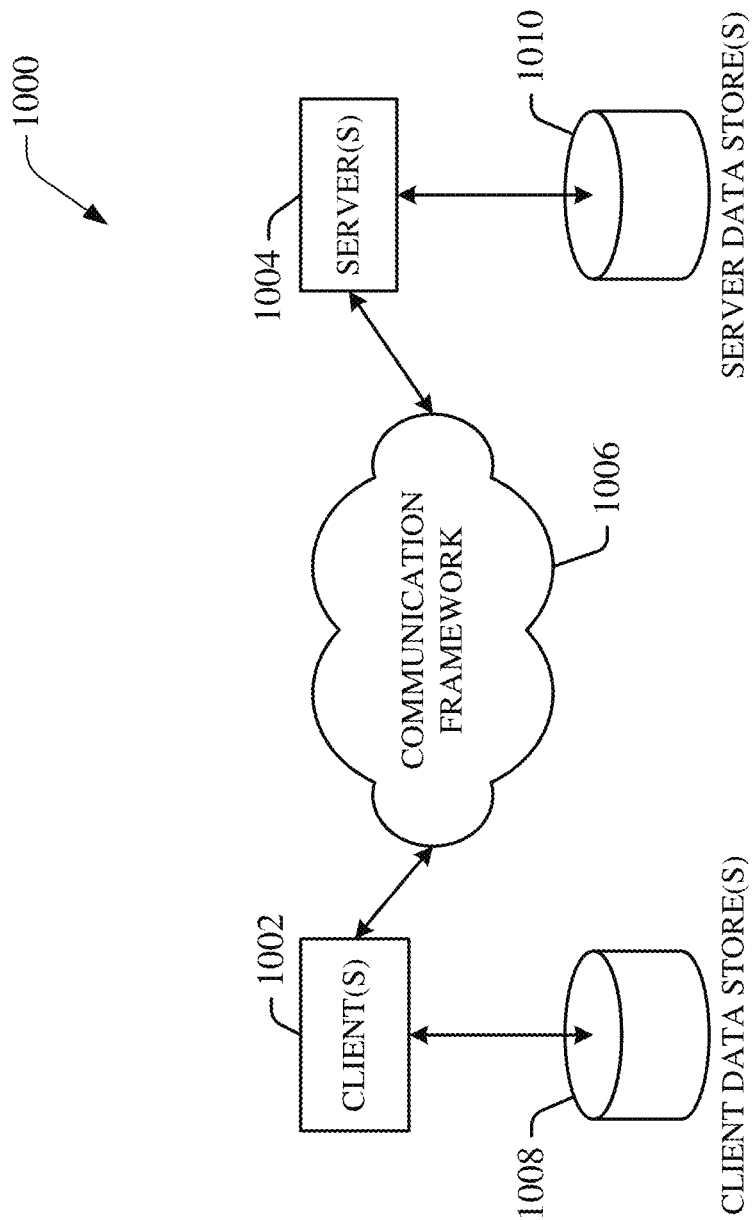
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets can include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is to be appreciated, that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A system, comprising:
   a plurality of battery cells; and
   a plurality of application specific integrated circuits (ASICs) electrically coupled to the plurality of battery cells, wherein one or more ASICs of the plurality of ASICs comprises a respective power ASIC, and wherein the ASICs comprise respective bidirectional direct current to alternating current (DC-AC) converters and charge or discharge the plurality of battery cells.

2. The system of any preceding clause, further comprising an electric motor electrically coupled to the plurality of ASICs, wherein the respective bidirectional DC-AC converters supply alternating current to the electric motor.

3. The system of any preceding clause, wherein the plurality of ASICs are communicatively coupled to each other via wireless connections.

4. The system of any preceding clause, wherein the respective bidirectional DC-AC converters comprise respective metal oxide semiconductor field effect transistor switches (MOSFETs).

5. The system of any preceding clause, wherein the plurality of ASICs comprise respective bidirectional direct current to direct current (DC-DC) converters that charge the plurality of battery cells and supply direct current to a direct current component of the system.

6. The system of any preceding clause, wherein
   the plurality of ASICs comprise respective battery cell impedance sensors, and
   the plurality of ASICs determine respective health statuses of the plurality of battery cells, according to a defined health metric, based on respective outputs of the respective battery cell impedance sensors.

7. The system of clause 1 above with any set of combinations of systems 2-6 above.

8. A power application specific integrated circuit (ASIC) for a battery cell of a battery pack, comprising:
   a direct current to direct current (DC-DC) bidirectional power conversion module comprising a DC-DC converter;
   a direct current to alternating current (DC-AC) bidirectional power conversion module comprising a plurality of metal oxide semiconductor field effect transistors (MOSFETs); and
   a processor that executes computer executable components stored in memory, wherein the computer executable components comprise a bridge component that controls one or more DC-AC bridges, or one or more DC-DC bridges.

9. The power ASIC of any preceding clause, wherein one or more MOSFETs of the plurality of MOSFETs comprise respective pluralities of MOSFETs connected in parallel.

10. The power ASIC of any preceding clause, wherein the bridge component changes one or more modes of one or more MOSFETs of the plurality of MOSFETs.

11. The power ASIC of any preceding clause, wherein the one or more modes comprise one or more of an active mode, a bypass mode, or a high impedance mode.

12. The power ASIC of any preceding clause, wherein the bypass mode comprises an electrical isolation of the battery cell from other battery cells in the battery pack.

13. The power ASIC of any preceding clause, wherein the high impedance mode comprises a defined reduced maximum electrical load on the battery cell.

14. The power ASIC of clause 8 above with any set of combinations of power ASICs 9-13 above.

15. A method, comprising:
   receiving, by a power application specific integrated circuit (ASIC), comprising a processor, for a battery cell of a battery pack, instruction data representative of an instruction to control one or more direct current to alternating current (DC-AC) bridges of the power ASIC or one or more direct current to direct current (DC-DC) bridges of the power ASIC; and
   based on the instruction,
      controlling, by the power ASIC, the one or more DC-AC bridges of the power ASIC using a DC-AC bidirectional power conversion module, of the power ASIC, comprising a plurality of metal oxide semiconductor field effect transistors (MOSFETs), or
      controlling, by the power ASIC, the one or more DC-DC bridges of the power ASIC using a DC-DC bidirectional power conversion module comprising a DC-DC converter.

16. The method of any preceding clause, further comprising:
   based on the instruction, changing, by the power ASIC, one or more modes of one or more MOSFETs of the plurality of MOSFETs.

17. The method of any preceding clause, wherein the one or more modes comprise one or more of an active mode, a bypass mode, or a high impedance mode.

18. The method of any preceding clause, wherein the bypass mode comprises an electrical isolation of the battery cell from other battery cells in the battery pack.

19. The method of any preceding clause, wherein the high impedance mode comprises a defined reduced maximum electrical load on the battery cell.

20. The method of any preceding clause, wherein the active mode enables a defined maximum electrical load on the battery cell.

21. The method of any preceding clause, wherein the instruction comprises a pulse width modulation input.

22. The method of any preceding clause, wherein one or more MOSFETs of the plurality of MOSFETs comprise respective pluralities of MOSFETs connected in parallel.

23. The method of clause 15 above with any set of combinations of methods 16-22 above.

What is claimed is:
1. A system, comprising:
   a plurality of smart battery cells, wherein each smart battery cell comprises:

an application specific integrated circuit (ASIC), wherein the ASIC comprises:
  a power ASIC that controls charging and discharging of the smart battery cell,
  a bidirectional direct current to alternating current (DC-AC) converter, and
  a battery cell impedance sensor, wherein the ASIC determines a health status of the of smart battery cell, according to a defined health metric, based on an outputs of the battery cell impedance sensor.

2. The system of claim 1, further comprising an electric motor electrically coupled to the ASICs, wherein the bidirectional DC-AC converters supply alternating current to the electric motor.

3. The system of claim 1, wherein the ASICs are communicatively coupled to each other via wireless connections.

4. The system of claim 1, wherein the bidirectional DC-AC converters comprise respective metal oxide semiconductor field effect transistor switches (MOSFETs).

5. The system of claim 1, wherein the ASICs further comprise respective bidirectional direct current to direct current (DC-DC) converters that charge the plurality of smart battery cells and supply direct current to a direct current component of the system.

6. A power application specific integrated circuit (ASIC) of a smart battery cell of a battery pack, wherein the power ASIC comprises:
  a direct current to direct current (DC-DC) bidirectional power conversion module comprising a DC-DC converter;
  a direct current to alternating current (DC-AC) bidirectional power conversion module comprising a plurality of metal oxide semiconductor field effect transistors (MOSFETs);
  a processor that executes computer executable components stored in memory, wherein the computer executable components comprise a bridge component that controls one or more DC-AC bridges, or one or more DC-DC bridges; and
  a battery cell impedance sensor, wherein the power ASIC determines a health status of the smart battery cell according to a defined health metric, based on an output of the battery cell impedance sensor.

7. The power ASIC of claim 6, wherein one or more MOSFETs of the plurality of MOSFETs comprise respective pluralities of MOSFETs connected in parallel.

8. The power ASIC of claim 6, wherein the bridge component changes one or more modes of one or more MOSFETs of the plurality of MOSFETs.

9. The power ASIC of claim 8, wherein the one or more modes comprise one or more of an active mode, a bypass mode, or a high impedance mode.

10. The power ASIC of claim 9, wherein the bypass mode comprises an electrical isolation of the smart battery cell from other smart battery cells in the battery pack.

11. The power ASIC of claim 9, wherein the high impedance mode comprises a defined reduced maximum electrical load on the smart battery cell.

12. A method, comprising:
  receiving, by a power application specific integrated circuit (ASIC), of a smart battery cell of a battery pack, instruction data representative of an instruction to control one or more direct current to alternating current (DC-AC) bridges of the power ASIC or one or more direct current to direct current (DC-DC) bridges of the power ASIC;
  based on the instruction,
    controlling, by the power ASIC, the one or more DC-AC bridges of the power ASIC using a DC-AC bidirectional power conversion module, of the power ASIC, comprising a plurality of metal oxide semiconductor field effect transistors (MOSFETs), or
    controlling, by the power ASIC, the one or more DC-DC bridges of the power ASIC using a DC-DC bidirectional power conversion module comprising a DC-DC converter; and
  determining, by the power ASIC, using an output of a battery cell impedance sensor of the power ASIC, a health status of the smart battery cell according to a defined health metric.

13. The method of claim 12, further comprising:
  based on the instruction, changing, by the power ASIC, one or more modes of one or more MOSFETs of the plurality of MOSFETs.

14. The method of claim 12, wherein the instruction comprises a pulse width modulation input.

15. The method of claim 12, wherein one or more MOSFETs of the plurality of MOSFETs comprise respective pluralities of MOSFETs connected in parallel.

16. The method of claim 12, wherein the power ASIC is electrically coupled to an electric motor.

17. The method of claim 13, wherein the one or more modes comprise one or more of an active mode, a bypass mode, or a high impedance mode.

18. The method of claim 17, wherein the bypass mode comprises an electrical isolation of the smart battery cell from other smart battery cells in the battery pack.

19. The method of claim 17, wherein the high impedance mode comprises a defined reduced maximum electrical load on the smart battery cell.

20. The method of claim 17, wherein the active mode enables a defined maximum electrical load on the smart battery cell.

* * * * *